United States Patent [19]

Fujiwara et al.

[11] Patent Number: 5,266,947
[45] Date of Patent: Nov. 30, 1993

[54] PARKING DATA TRANSFER SYSTEM

[75] Inventors: Hidetoshi Fujiwara; Ikuo Nishitaka, both of Tokyo, Japan

[73] Assignees: Max Inc.; Nihon Keiei Kikaku Kenkyujo Co., Ltd., both of Tokyo, Japan

[21] Appl. No.: 805,941

[22] Filed: Dec. 12, 1991

[30] Foreign Application Priority Data

Feb. 28, 1991 [JP] Japan .................................. 3-117079
Jun. 5, 1991 [JP] Japan .................................. 3-230744

[51] Int. Cl.$^5$ ............................................. B60Q 1/48
[52] U.S. Cl. .......................... 340/932.2; 340/309.15; 340/539; 364/467; 235/377; 368/7; 368/90
[58] Field of Search ............... 340/932.2, 309.15, 539, 340/825.15, 825.8, 825.29, 825.44, 825.45, 825.46, 825.47, 825.69, 825.72; 11/11; 364/467; 235/377; 368/7, 8, 89, 90, 92

[56] References Cited

U.S. PATENT DOCUMENTS

| 4,310,890 | 1/1982 | Trehn et al. ............... 340/932.2 |
| 4,356,903 | 11/1982 | Lemelson et al. ........... 340/932.2 |
| 5,004,997 | 4/1991 | Shisgal et al. ............ 340/309.15 |

Primary Examiner—Donnie L. Crosland
Attorney, Agent, or Firm—Keck, Mahin & Cate

[57] ABSTRACT

A parking data transfer system has first and second communications devices. The first communications devices each include a timing device, a first display for displaying a parking time and first transmitter for transmitting a notification when the time measured by the timing device has reached the parking time. The second communications devices each include a notifying device for notifying receipt of the notification transmitted by the first transmitter. The first communications device modifies the parking time on receipt of an updating signal transmitted by the second communications device.

8 Claims, 11 Drawing Sheets

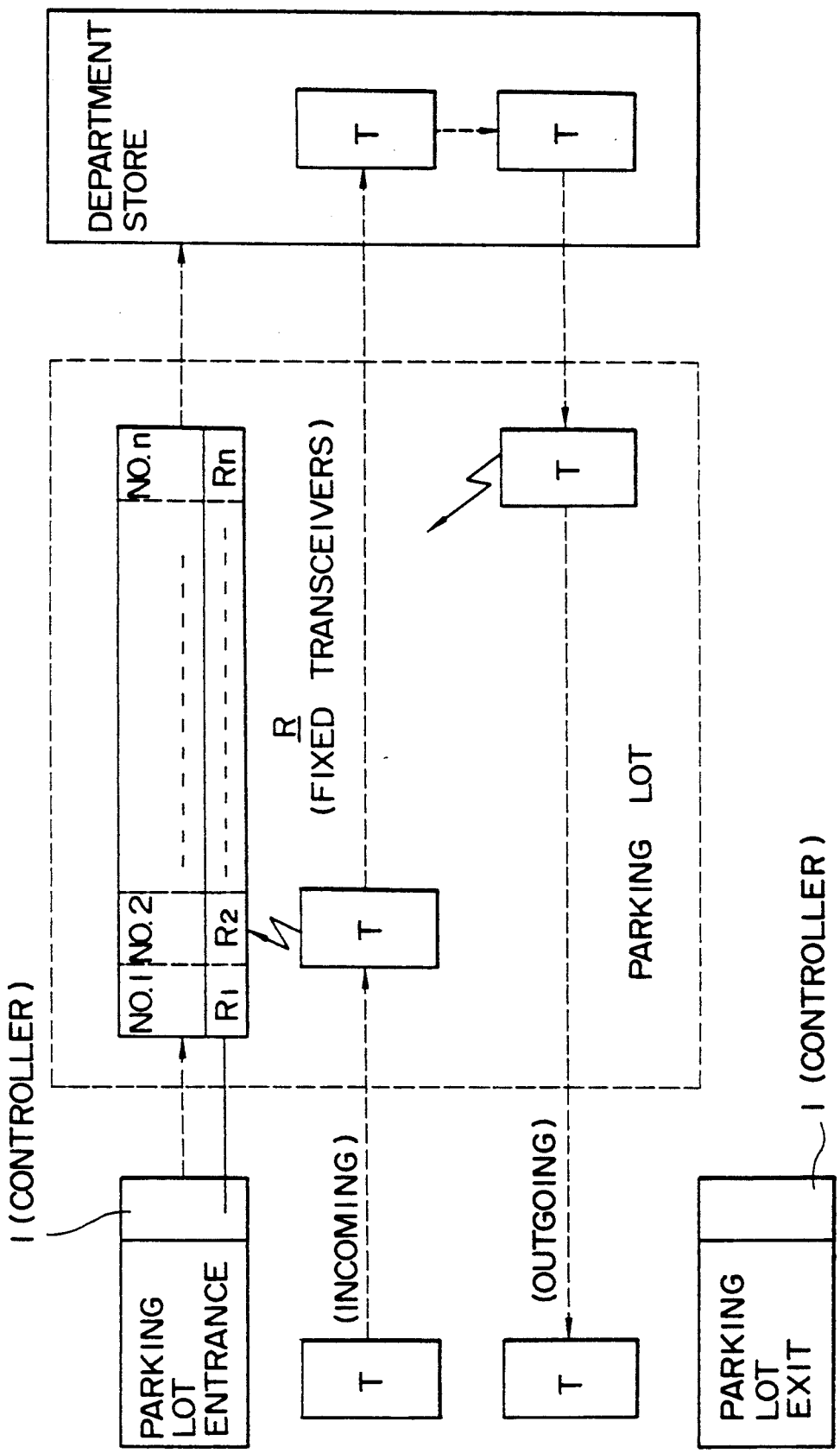

PARKING DATA TRANSFER SYSTEM

BACKGROUND OF THE INVENTION

1. Field of the Invention

This invention concerns a parking data transfer system for use when vehicles are parked in parking lots or outside department stores, event arenas and amusement parks, wherein drivers can be informed that their parking time has expired, other persons can be informed of the time at which the parking time of parked vehicles is due to expire, and a predetermined parking time can be changed.

2. Prior Art of the Invention

Conventionally, when vehicles were parked in parking lots or on the street, there was no way of knowing when their parking time was due to expire, and this was very troublesome to other drivers who wished to park their vehicles at the same spot.

If the parking time was restricted, moreover, although drivers were obliged to return to their vehicle by an appointed time, they sometimes forgot that the time limit had expired. Alternatively, if they wished to change the predetermined time, they were unable to do so which was also very inconvenient.

When a vehicle enters a parking lot at event arenas or amusement parks, etc., a ticket is normally handed at to the drivers at the parking lot entrance which displays the entry time and a vehicle number.

From this ticket, the parking status of a vehicle can be assessed at the time it is parked. It is however impossible to know when drivers will return to their vehicle, for example, whether they will return within 30 minutes or 1 hour. When the parking lot is full, this was extremely inconvenient as other drivers could not be told how long they would have to wait to be able to park their vehicle.

SUMMARY OF THE INVENTION

It is therefore an object of this invention to provide a parking data transfer system wherein other drivers can be informed of when the parking time of parked vehicles is due to expire, wherein the parking time of a vehicle can be changed, and wherein drivers can be informed when the predetermined parking time of their vehicle has expired.

It is a further object of this invention to provide a parking data transfer system wherein the parking status of a vehicle can be assessed at, for example, 30 minutes or 1 hour after it is parked.

BRIEF DESCRIPTION OF DRAWINGS

FIG. 11 is a plan view showing the positional relation of parked vehicles and a department store.

DETAILED DESCRIPTION

Specific embodiments of the invention will now be described in more detail with reference to the drawings.

Figure 1:
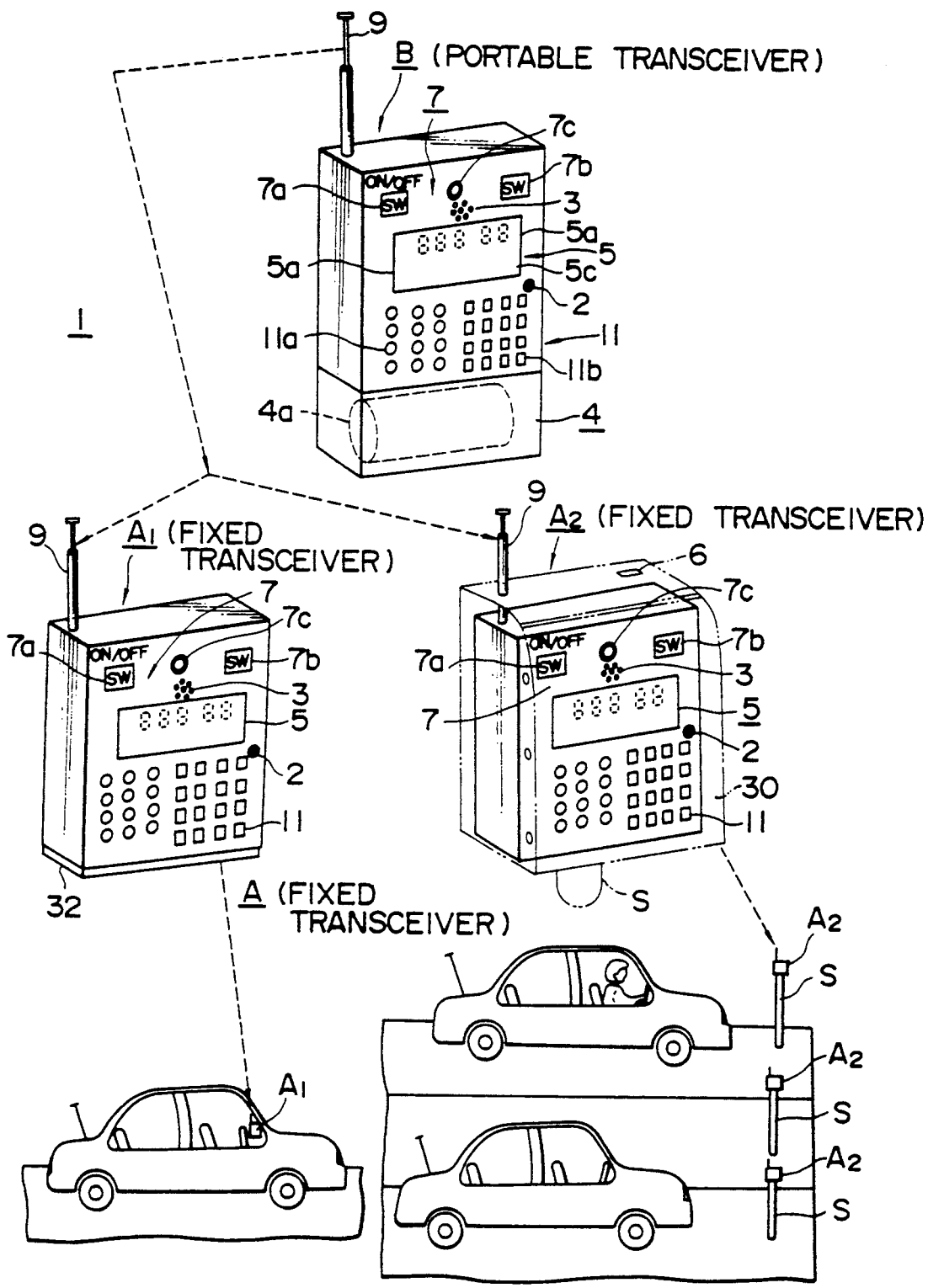
FIG. 1 is an inclined schematic view of the whole of the parking data transfer apparatus according to the present invention when in use.

As shown in FIG. 1, a parking data transfer system 1 according to the present invention comprises fixed transceivers A, and portable transceivers B.

There are two types of transceivers A, i.e. A1 and A2. Fixed transceivers A1 are installed in vehicles when they are parked, while fixed transceivers A2 are used in the same way as parking meters in, for example, department stores, event arenas and amusement grounds.

Figure 2:
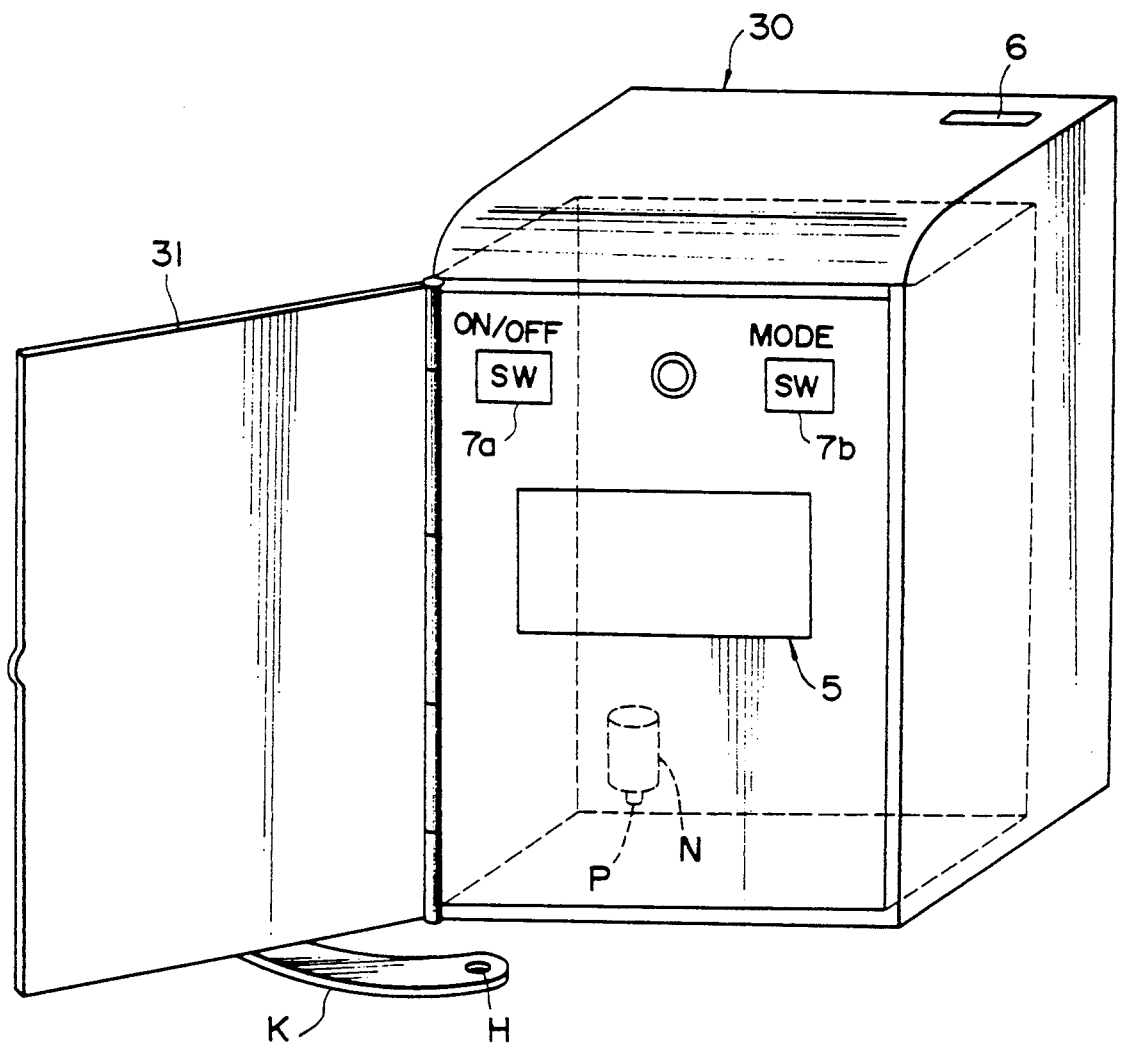
FIG. 2 is an inclined view showing a case.

The fixed transceiver A2 is used when installed in a transparent case 30 which may be attached to a support S at the roadside or in a parking lot. This case 30 has a slot 6 for introducing coins. When a coin is inserted in this slot 6, a transparent door 31 of the case 30 unlocks so that it can be opened as shown in FIG. 2. The lock on the door is operated by a solenoid N, and comprises a pin P projecting from the base of the case 30 inserted in a hole H in an arc-shaped member K provided in the lower part of the door 31. The introduction of a coin causes the solenoid N to disengage the pin P so as to release the lock, and also switches on the power supplied to the fixed transceiver A2.

The solenoid N is installed at the rear of the fixed transceiver A2 inside the case 30.

The fixed transceiver A1, on the other hand, is installed either inside or on the body of a vehicle such that it can be freely attached or detached by means of an electromagnet, a fixing member coated with press-on adhesive or the like, the position of installation being such that a display 5 to be described hereinafter is visible. Alternatively, it may be mounted as one unit together with a radio or other devices on the instrument panel. In this latter case, the mounting is such that the display 5 is be visible from outside the vehicle.

As the fixed transceiver A1 is almost identical to the transceiver B, the transceiver B will mainly be described hereinafter.

The portable transceiver B comprises circuits to be described hereinafter housed in a compact, box-shaped case F which can be carried in a shirt pocket or the like.

On the face of the case F there is provided a speaker 2 at center right for emitting the sound of a buzzer or other sounds at center right, a display 5 in the upper center, a microphone 3 for recording sounds on an audio IC to be described hereinafter in a central position above the display 5, switches 7 above the microphone 3 and an operating unit 11 below the display 5. An extendable antenna 9 is provided on one side at the top of the case F such that the antenna is free to rotate. A vibrating unit 4 housing a vibrator 4a is also provided in the lower part of the case F.

The aforesaid display 5 comprises mainly liquid crystals. The upper part 5a displays the time and the lower part 5b displays messages by means of characters and symbols, both these parts being illuminated by a backlight 5c.

The switches 7 comprises a power switch 7a and a mode selector switch 7b, there being also provided a lamp 7c which lights when the power switch 7a is switched on.

Each time the mode selector switch 7b is pressed, the mode changes. If it is pressed once, for example, the unit enters the character input mode so that parking time or information can be input from the ten key pad 11a or the character panel 11b. If the mode selector switch 7b is pressed twice, the unit enters the audio mode so that sounds picked up by the microphone 3 can be recorded on an audio IC to be described hereinafter.

If the mode selector switch 7b is pressed three times, the unit enters the display mode so that when a set parking time has expired, the message "Return to Your Vehicle" is displayed on the display 5. If it is pressed four times, the unit enters the vibration mode so that when the set parking time has expired, the vibrator 4a vibrates. If it is pressed five times, the unit enters the extension mode so that the aforesaid parking time can be changed.

The internal circuitry of the portable transceiver B will now be described in outline with reference to FIG. 3.

Figure 3:
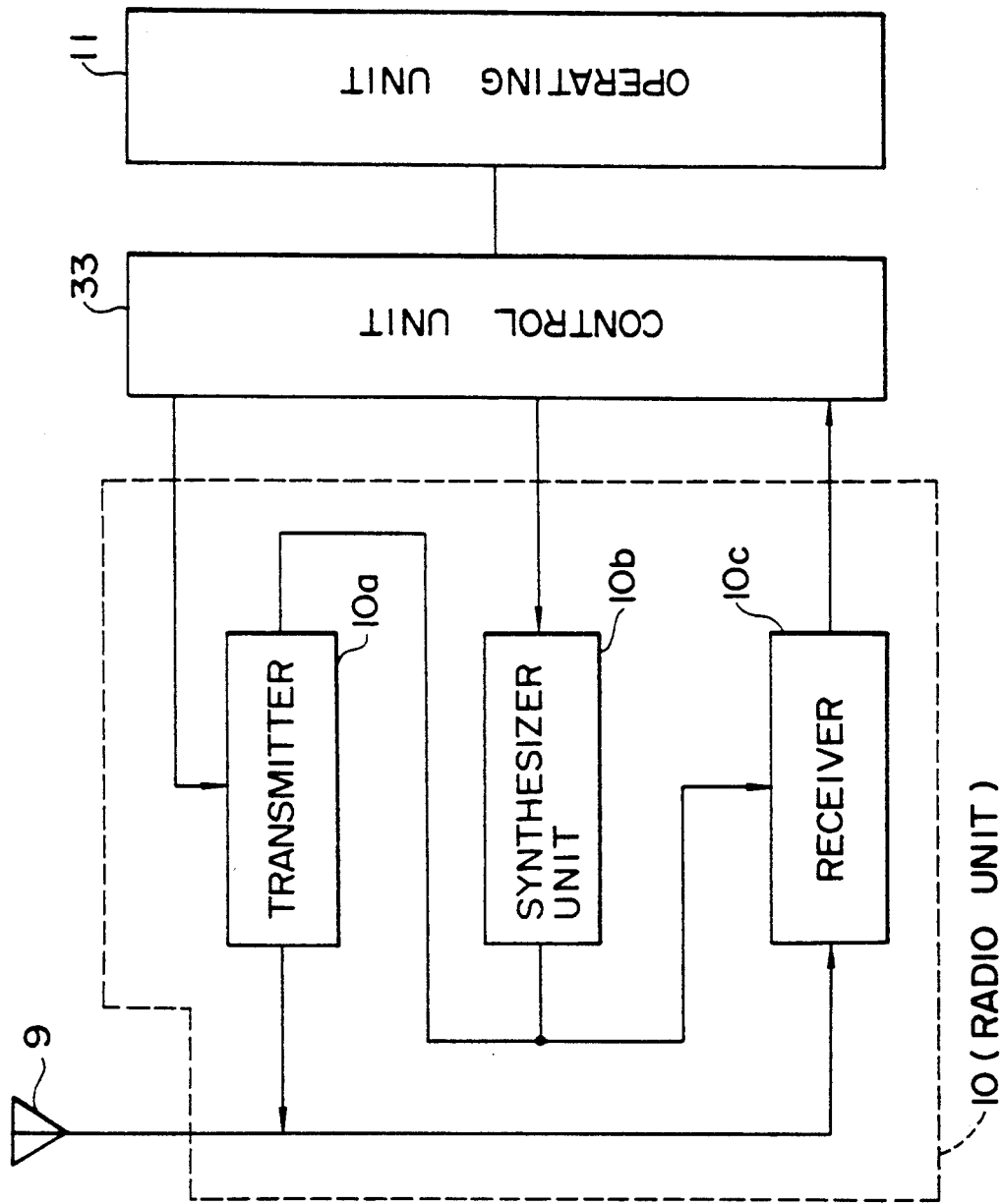
FIG. 3 is a block diagram showing an outline of the internal circuitry of a portable transceiver.

In FIG. 3, 33 is a control unit connected to the operating unit 11 and also to a radio unit 10.

The radio unit 10 comprises a transmitter 10a, a synthesizer 10b, a receiver 10c and the antenna 9.

Figure 4:
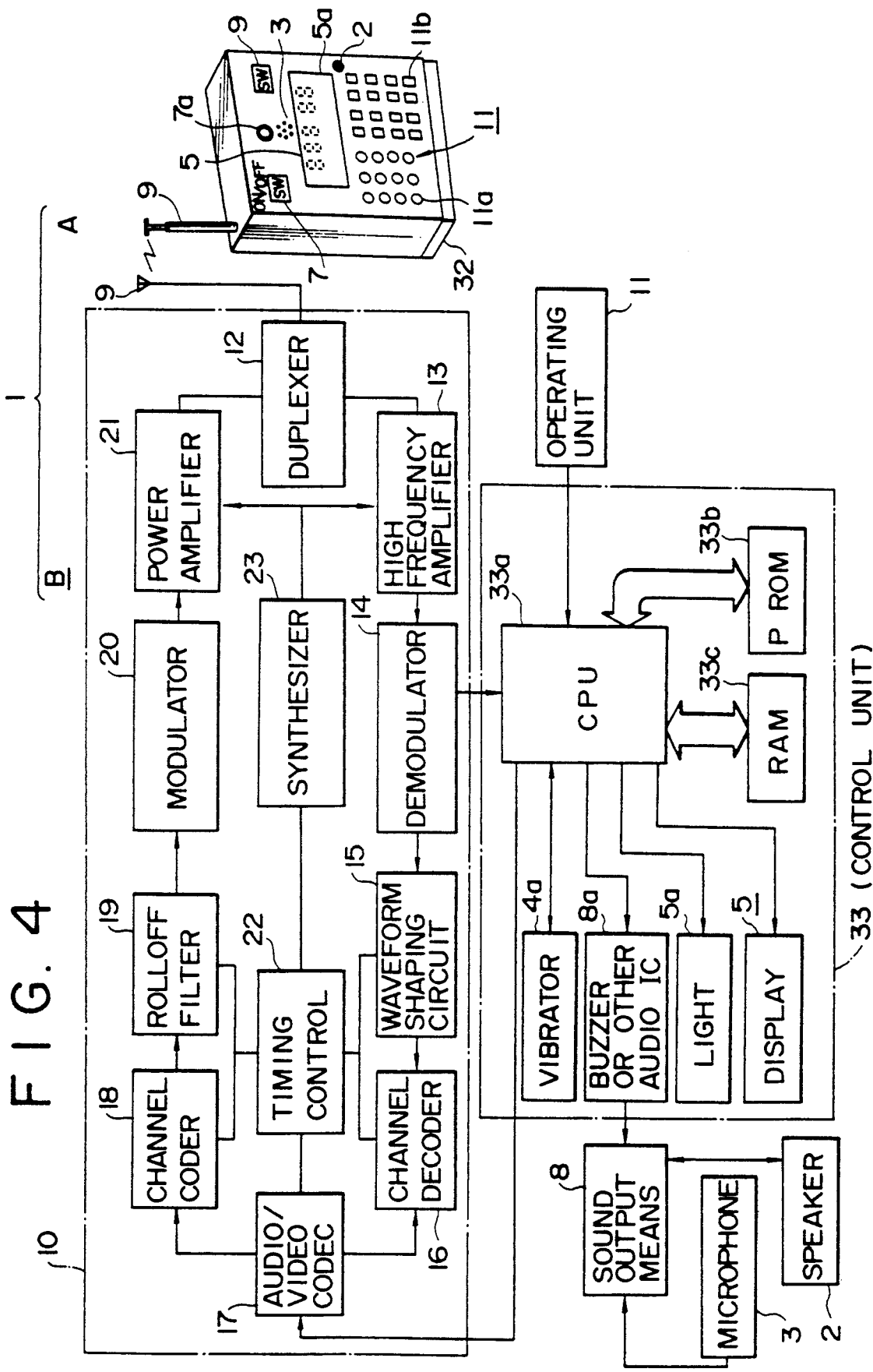
FIG. 4 is a block diagram showing the detailed internal structure of the transceiver of which the circuitry is shown in FIG. 3.

As shown in FIG. 4, the antenna 9 is connected to a duplexer circuit 12 of the radio unit 10. 13 is a high frequency amplifier, and 14 is a demodulator. The demodulator 14 is connected to a CPU 33a of the control unit 33 via an interface circuit, not shown.

When a command signal demodulated by the demodulator 14 is input to the CPU 33a, a drive signal is sent to the vibrator 4a based on a program previously set by a PROM 33b, or a desired audio signal recorded by an audio IC 8a is sent to an audio output means (D/A converter) 8.

Further, the CPU 33a also displays the time to return to a vehicle or messages as necessary on the display 5.

The CPU 33a is connected to the operating unit 11, and writes information input from the ten key pad 11a or the character panel 11b in an RAM 33c.

Another output of the demodulator 14 is connected to a waveform shaping circuit 15. 16 is a channel decoder, and 17 are audio and video codec circuits.

The audio and video codec circuits 17 transmit audio and video signals controlled by the CPU 33a via a channel coder 18, a roll-off filter circuit 19, a modulator 20, a power amplifier 21 and the duplex circuit 12 from the antenna 9 to the fixed transceivers A. 22 is a timing control circuit and 23 is a synthesizer.

In the case of the fixed transceiver A1, the switch 7a is first switched on and the mode selector switch is pressed. If for example the character input mode is selected, the vehicle parking time and scheduled driver return time are entered on the ten key pad 11a. This parking time and scheduled return time are displayed on the display 5 to confirm that the data is correct, and are set by pressing an EXECUTE key, not shown. The fixed transceiver A1 is then attached to the vehicle so that the data displayed on the display 5 are visible from outside the vehicle.

The power switch 7a on the portable transceiver B is also switched on, and the mode selector switch 7b is pressed to select the character input mode. The message "Return to Your Vehicle" is entered from the character input panel 11b and stored in the RAM 33c of the portable transceiver B. If the driver intends to travel far away from the vehicle or to a location difficult to find, the intended location is also stored. Next, he presses the mode selector switch 7b to select the audio input mode, and the message "Return to Your Vehicle" is input to the audio IC 8a of the portable transceiver B. If the driver is going to a business meeting, he presses the mode selector switch 7b to select the vibration mode.

The driver then puts the portable transceiver B in his pocket, and leaves for the department store, amusement grounds or business meeting.

When the scheduled return time set by the driver arrives, the CPU 33a of the fixed transceiver A operates automatically, and signals indicative of the vehicle parking time and driver return time are transmitted to the portable transceiver B from the antenna 9.

The portable transceiver B receives these signals from the fixed transceiver A1. Based on the received signals, the audio message "Return to Your Vehicle" which is stored in the audio IC 8a is output by the CPU 33a of the transceiver B from the speaker 2, and the vehicle parking time and scheduled driver return time are displayed simultaneously by the display 5. Further, the CPU 33a also drives the vibrator 4a so that the driver, who is busy shopping, amusing himself or having business discussions, is made aware by means of sound and vibration that the scheduled return time has arrived.

The driver then confirms the vehicle parking time and scheduled return time which are displayed on the display 5.

Thus, even if the driver forgets that his parking time has expired due to involvement in other activities such as business discussions, he can be reminded of it automatically without any effort on his part, and parking offences can thereby be prevented. Further, even drivers who are hard of hearing, for example, can be reminded of the time by the vibration of the transceiver which provides an even higher level of security.

If the driver wishes to extend the parking time, the driver operates the mode selector switch 7b of the portable transceiver B so as to select the extension mode, sets an extended time by means of the ten key pad 11a, and transmits a signal indicative of the extended time from the portable transceiver.

When the fixed transceiver A1 receives this signal, the CPU 33a of the transceiver A1 updates the set parking time and scheduled driver return time displayed on the display 5 by the extended time, and displays the new time.

As the parking time and return time are displayed on the display 5 of the fixed transceiver A1 attached to the vehicle such that they are visible from outside the vehicle, other drivers can be informed of the time until when the vehicle is parked, and they therefore know how long they have to wait to park their own vehicle at the same spot. Further, when the parking time displayed on the display 5 of the fixed transceiver A1 is updated, other drivers can be made aware of this too which is very convenient.

Further, if a passenger left behind in the vehicle wishes to communicate urgently with the driver who is carrying the portable transceiver B or tell him of a change in plans, he can do so by switching on the mode selector switch 7b of the fixed transceiver A1 and entering the information from the operating unit 11.

Similarly, using the portable transceiver B in the aforesaid manner, the driver can also communicate urgently with a passenger left behind in the vehicle or tell him of a change in plans which further increases the utility of the system.

In the case of the fixed transceiver A2, a map or address indicative of the location where the transceiver is installed is first entered in a program of the CPU 33a. If the portable transceiver B is then operated to send a command signal, the fixed transceiver A2 transmits this map or address information to the transceiver B. Therefore, if the driver forgets the parking lot or parking meter where the vehicle is parked, or if he loses his way, he can obtain this information from the fixed transceiver A2 by operating the portable transceiver B. If further he displays this information on the display 5 of the portable transceiver B, he can return to his parked vehicle even if the way is unfamiliar to him.

Figure 5:
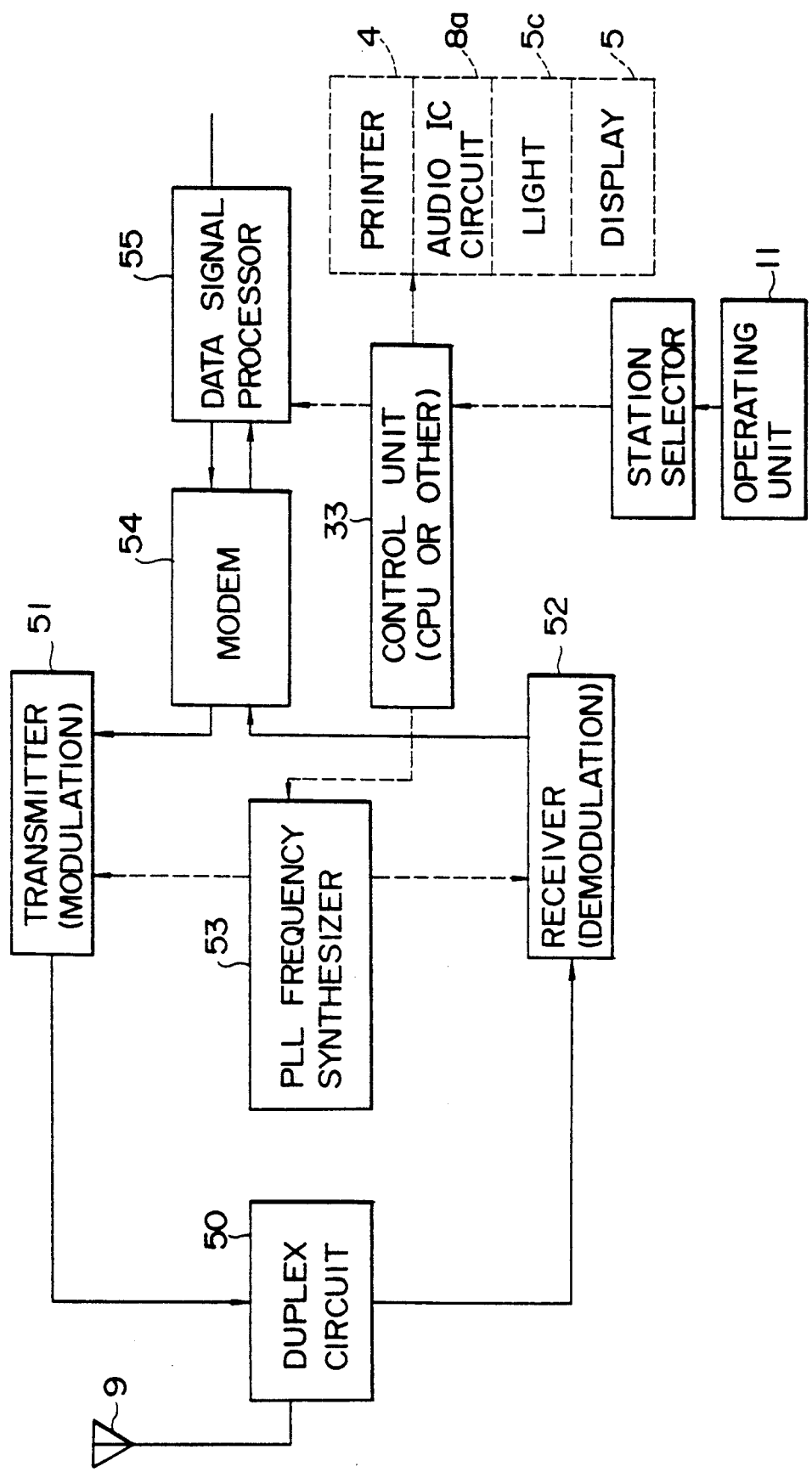
FIG. 5 is a block diagram showing the internal circuitry when the portable transceiver has an analog circuit construction.

FIG. 5 shows another embodiment of the data control system of this invention. In this case, the receiving circuits are analog circuits.

Equivalent parts in this embodiment have the same numbers in the drawings, and their description is therefore omitted.

In this embodiment, a transmitter 51 and a receiver 52 having analog circuits are used. The modulating means comprises a modem 54 connected to a data processing signal circuit 55 together with a PLL frequency synthesizer 53 as a signal generating means.

The control operations are arranged so as to be carried out by a control unit 33 in the same way as according to the first embodiment.

According to this embodiment, substantially the same effects are obtained as in the case of the first embodiment.

A case will now be described where the aforesaid parking data transfer system is applied in a parking lot of a department store, for example.

Figure 6:
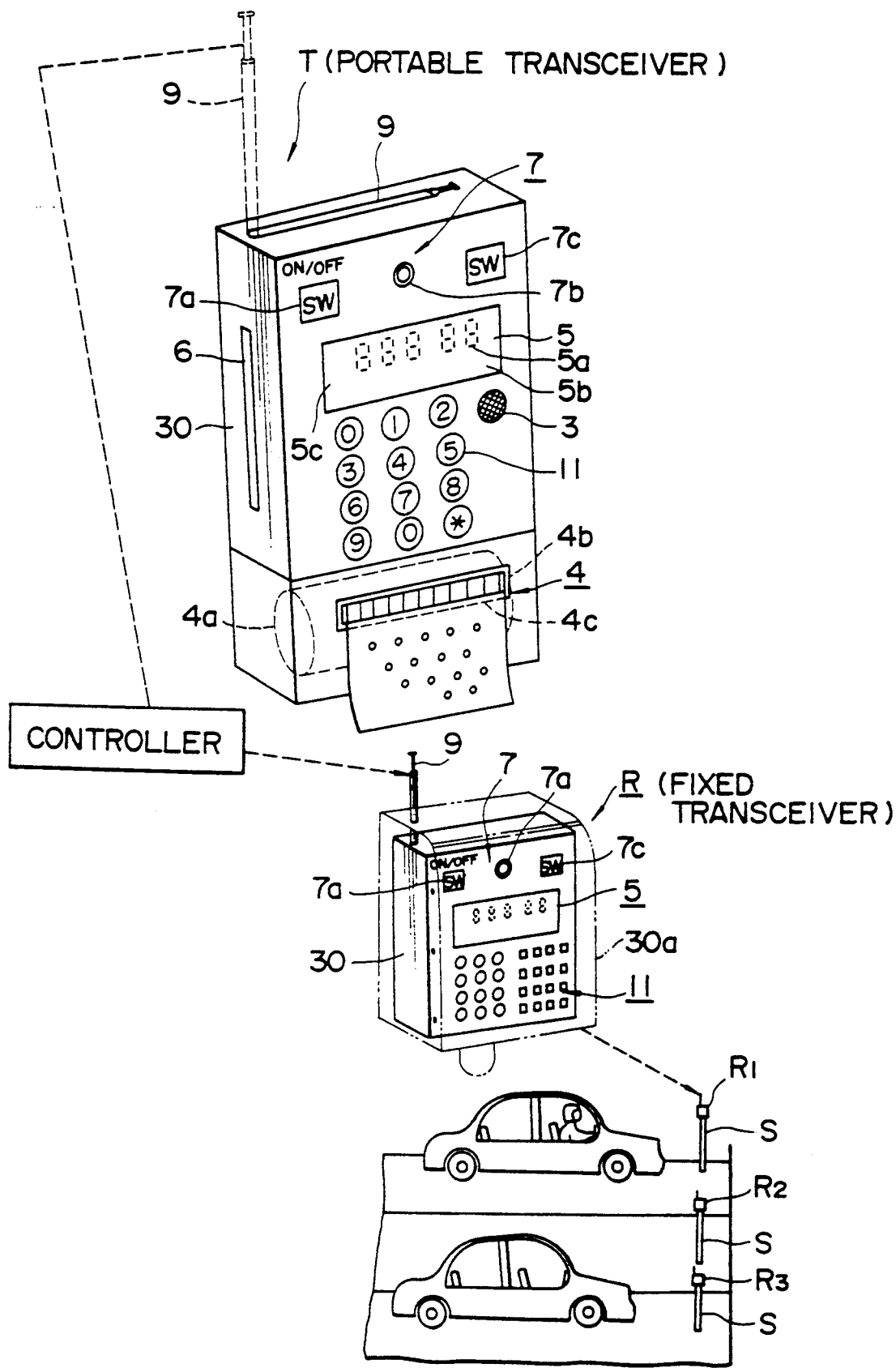
FIG. 6 is an inclined view! showing an outline of the parking lot management system according to the present invention when in use.

As shown by FIG. 6, this parking data transfer system comprises a controller 100 installed in the control room of the parking lot, fixed transceivers R for relays, and portable transceivers T.

The fixed transceivers R are used as parking meters in, for example, department stores, event arenas and amusement grounds, and they are of identical construction to the fixed transceivers A2.

The portable transceivers T are provided with a printer unit G in their base. This printer unit G is controlled by the control unit 33 (FIG. 4), and prints out a fee calculated by the CPU 33a. The printer G comprises a paper roll Ga, a printing section Gb comprising a line printer or the like, and a paper cutter Gc. The portable transmitter T is further provided with a card slot 6a into which a purchase confirmation card may be introduced when goods are purchased in the store.

Apart from the above details, the transceiver T is of identical construction to the portable transceiver B shown in FIG. 1.

Figure 7:
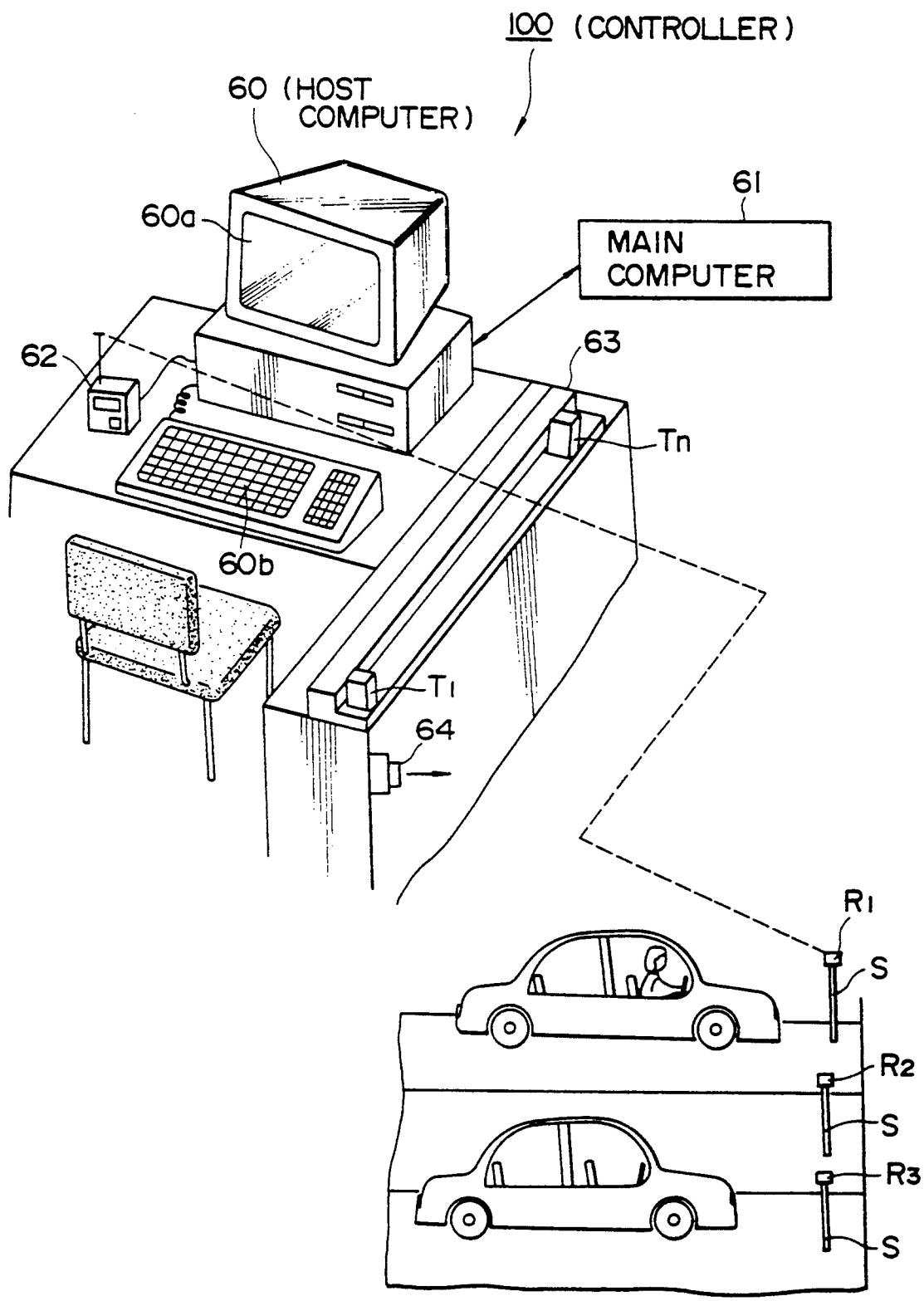
FIG. 7 is an inclined view showing an outline of the control room where the apparatus according to the present invention is used.

The controller 100 will now be described. As shown in FIG. 7, the controller 100 comprises a host computer 60 installed in the control room at the entrance to the parking lot, a main computer 61 connected to this host computer, a communications device 62a provided with an antenna 62a, and a vehicle detector 64 consisting of an imaging device such as a CCD.

The portable transceiver T is so constructed that it can be mounted on a battery charger 63 installed in the control room. When the transceiver T is mounted on the battery charger 63, it is charged. This charging takes place when terminals, not shown, connected to the electrodes of an internal battery, not shown, provided in the base of the portable transmitter T, provided into contact with power terminals, not shown, of the battery charger 63 to which a D.C. voltage is applied.

60a is a display of the host computer 60, and 60b is a key pad from which various information or modifications can be input to the main computer 61.

The entrance and exit of the aforesaid control room are arranged in practically the same way, and the same operations can be carried out at both.

The internal circuitry of the portable transmitter T is the same as the circuitry shown in FIG. 4 except that the printer unit G is connected instead of the vibrator 4a.

Figure 8:
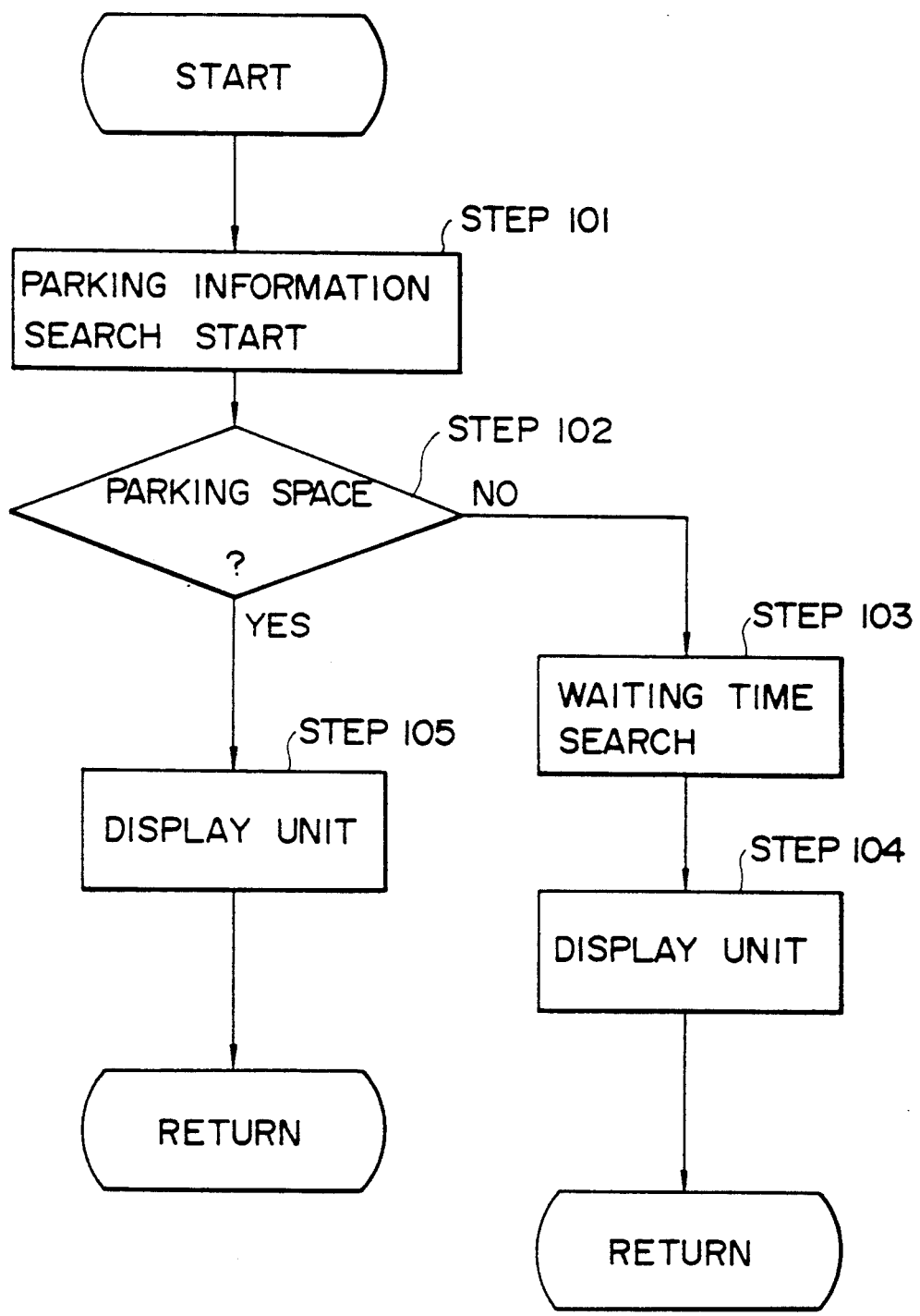
FIG. 8 is a flowchart showing the action of a host computer and a main computer.
Figure 9:
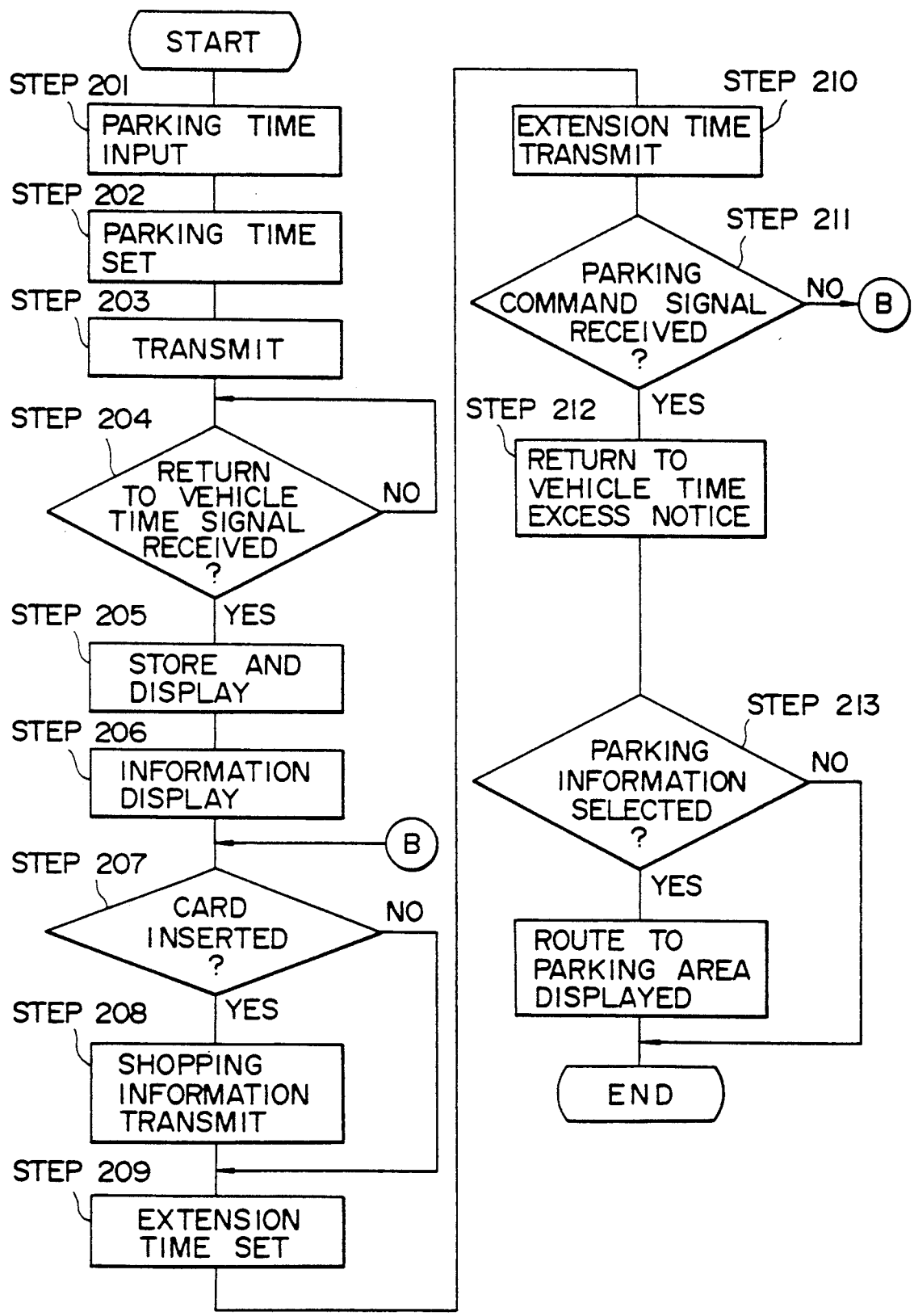
FIG. 9 is a flowchart showing the action of the CPU of the portable transceiver.
Figure 10:
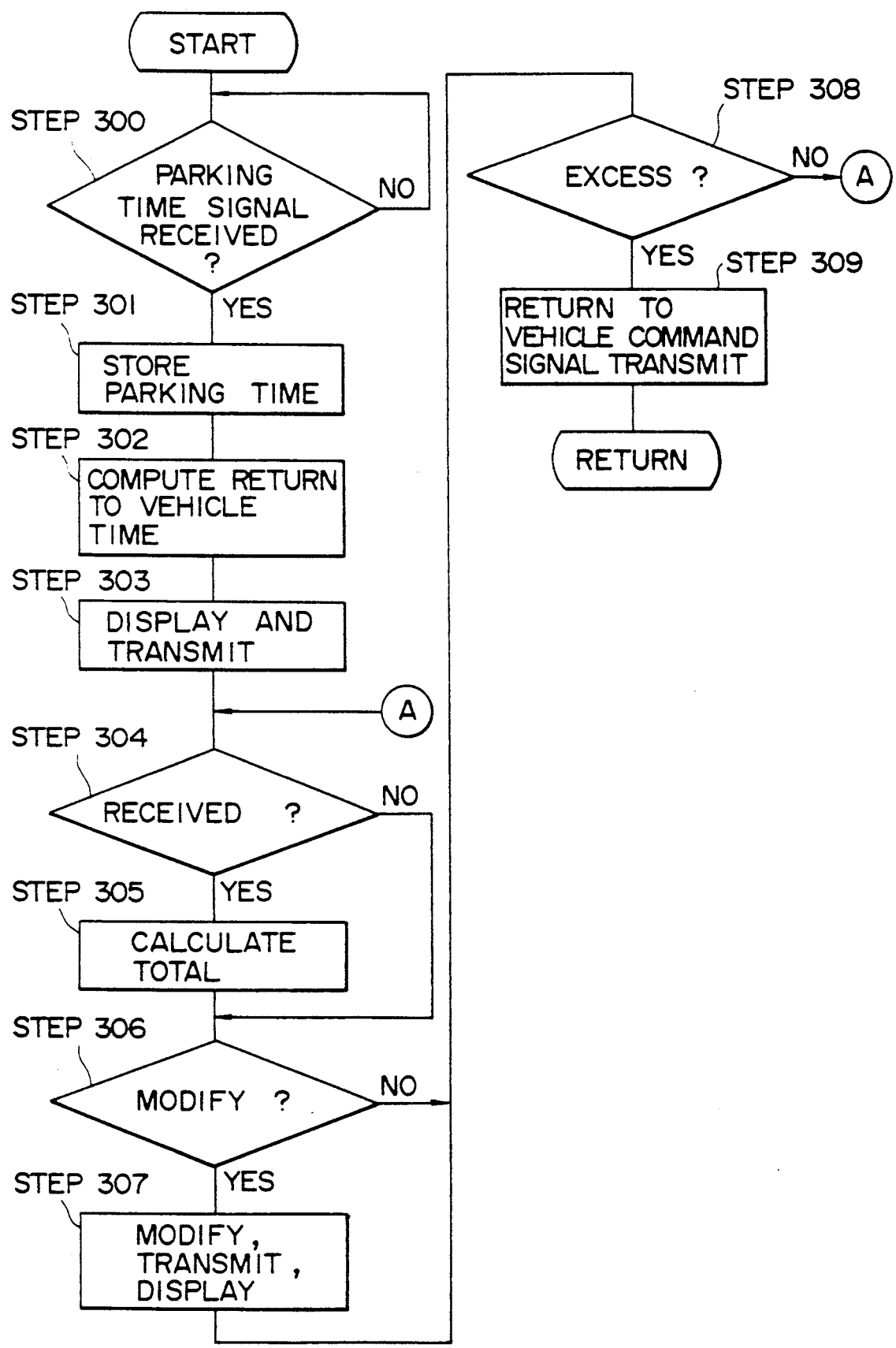
FIG. 10 is a flowchart showing the action of a host computer and a main computer.

Next, the action of the aforesaid embodiment will be described with reference to the flowcharts shown in FIG. 8–FIG. 10.

First, when a vehicle enters the parking lot, a vehicle detection sensor 64 detects the entry of the vehicle and outputs a signal to the host computer 60. The host computer 60 and main computer 61 then initiate actions according to the flowchart shown in FIG. 8.

In a step 101, a CPU, not shown, installed in the main computer 61 searches vehicles due to vacate parking space and vacant parking lot numbers stored in the memory of the main computer 61.

Next in a step 102, from the results of the search in the step 101, it is determined whether or not there are any vehicles due to vacate space and vacant parking lot numbers. If not, i.e. if the answer to this question is negative (NO), the program proceeds to a step 103.

In a step 103, a waiting time stored in another address of the memory of the main computer 61 is output to the host computer 60.

In a step 104, the waiting time output by the main computer 61 is input by the host computer 60 to be displayed on a display 60a.

If on the other hand there are vehicles due to vacate space and vacant parking lot numbers available, i.e. the answer to the question of the step 104 is affirmative (YES), the host computer 60 reads this information from the memory of the main computer 61. In a step 105, this information is displayed on the display 60a, and after the steps 104 and 105, the program returns to a main routine, not shown.

In the control room, an operator tells the driver the frequency of a portable transceiver corresponding to the parking lot number displayed on the display 6a, and the driver removes a specified portable transceiver Tn from the battery charger 63 installed in front of the control room.

Next, the switch 7a of the portable transceiver Tn is switched on to enter the start mode.

Next, the driver presses the mode selector switch 7b on the portable transceiver Tn to select the character input mode, and inputs a parking time from the ten key pad 11a of the control unit (step 201). The parking time is thereby displayed on the display 5. After the driver has confirmed the parking time displayed on the display 5, he presses the EXECUTE key on the character input unit 11b to set the parking time (step 202). The parking time is thereby stored in the RAM 33c, and the CPU 33 starts a clock at the same time.

The CPU 33a of the portable tranceiver Tn also transmits a parking time signal stored in the RAM 33c to a relay transceiver 62 in the control room (step 203).

The host computer 60 then determines in a step 300 whether or not the relay transceiver 62 has received the parking time signal. When the relay transceiver 62 receives the parking time signal, the host computer 60 sends it to the main computer 61. The parking time is thereby stored in the memory of the main computer 61 (step 301).

If the answer to the question in a step 300 is negative (NO), the program returns to a step 300 which is part of a main routine not shown. The main routine comprises a step to detect a vehicle, and to determine whether or not a parking time signal has been received. This step is repeated over and over again. If a vehicle is detected in this step, the program leaves the main routine to go to the routine shown in FIG. 8. Further, if a parking time signal is received, the program leaves the main routine to go to the routine shown in FIG. 10, i.e. the step 300 is one step in the main routine.

In a step 302, the main computer 61 computes a scheduled driver return time from the parking time, and outputs signals indicative of a vehicle entry time and scheduled driver return time to the host computer 60.

In a step 303, the vehicle entry time and scheduled driver return time are displayed for a predetermined time period on the display 60a, and at the same time, the host computer 60 transmits signals indicative of this information from the relay transceiver 62 to the portable transceiver Tn.

The portable transceiver Tn then determines in a step 204 whether or not a signal indicative of the scheduled return time has been received, and if the answer to this question is affirmative (YES), the program proceeds to a step 205. If the answer is negative (NO), the program returns to the step 204. In the step 205, the CPU 33a of the portable transceiver Tn writes the vehicle entry time and scheduled return time in a RAM 33c based on the signal received, and displays this information for a predetermined time period on the display 5 of the portable transceiver Tn.

In a step 206, the location of the parking lot number programmed in the PROM 33b of the portable transceiver Tn is displayed on the display 5 of the transceiver Tn. Using this information, the driver moves his vehicle to the designated parking lot number, and parks it.

The driver puts the portable transceiver Tn in his pocket, and in this example goes to a department store where he makes purchases. In the store, the parking lot user receives a purchase confirmation card which he inserts in a slot 6a of the portable transceiver Tn.

In a step 207, the CPU 33a of the transceiver Tn determines whether or not a card has been inserted. If the answer to this question is affirmative (YES), the shopping information is stored in the RAM 33c of the transceiver Tn, and at the same time, the sum purchased by the parking lot user is transmitted to the relay radio 62 from the antenna 9 (step 208).

If the answer in the step 207 is negative (NO), the program proceeds to a step 209.

In a step 304, the host computer 60 determines whether or not a signal indicative of the sum purchased has been received. If the answer to this question is negative (NO), the program proceeds to a step 306, while if is affirmative (YES), the program proceeds to a step 305. In the step 305, the main computer 61 continuously sums the value of the purchases made by the parking lot user and stores the value in the memory.

If on the other hand, the parking lot user exceeds the scheduled return time, he selects the extension mode on the operating unit 11 of the transceiver Tn, sets the extension time by the ten key pad 11a, and transmits a signal indicative of this extension time from the portable transceiver Tn (steps 209, 210).

When the relay radio 62 receives this transmission, a signal indicative of the extended time is sent to the main computer 61.

In a step 306, the main computer 61 determines whether or not the initial driver return time has been modified.

If the answer to the question in the step 306 is affirmative (YES), the program proceeds to a step 307. In the step 307, the initial parking time is updated, and the host computer 60 displays this updated parking time and driver return time on the display 60a. At the same time, the updated parking time and driver return time are transmitted to the portable transceiver Tn via the antenna 62a of the relay radio 62, and stored in the RAM 33c.

If there is a case of sudden illness or an urgent message to be conveyed, the driver may operate the operating unit 11 of the portable transceiver Tn to transmit this information to the relay radio 62. The information is then displayed on the display 60a of the host computer 60 so that the control room can take suitable measures to deal with it.

Further, if the answer to the question in the step 306 is negative (NO), the program proceeds to a step 308.

Next, in a step 308, it is determined whether or not the parking lot user has forgotten the scheduled return time and exceeded his time limit due to preoccupation with purchases.

If the time limit has not been exceeded, i.e. the answer to the question in the step 308 is negative (NO), the program returns to the step 304, and the actions of the steps 304–308 are repeated until the time limit has been reached.

If on the other hand the time limit has been exceeded, i.e. the answer to the question in the step 308 is affirmative (YES), the program proceeds to a step 309, and a command is transmitted by the main computer 60 to cause a signal to be sent from the relay radio 62 to the portable transceiver Tn, to the effect that the driver should return to his vehicle. Subsequently, the program returns to the main routine, not shown.

In a step 211, the portable transceiver Tn determines whether or not a return to vehicle signal has been received. If the answer to this question is affirmative (YES), time-over messages are notified to the driver by means of a buzzer or sound from the audio IC 8a in the order in which they are programmed in the PROM 33c (step 212). If on the other hand the answer to this question is negative (NO), the program returns to the step 207.

In a step 213, it is determined whether or not the driver has pressed the mode selector switch 7b of the portable transceiver Tn to select parking lot information.

If the answer to the question of the step 213 is affirmative (YES), the CPU 33a outputs the location information programmed in the PROM 33b of the portable transceiver Tn (step 214), this information is displayed on the display 5, and the program ends.

Based on this location information on the display 5, the driver can speedily return to his vehicle parked at the specified parking lot number in the parking lot without losing his way.

If on the other hand the driver does not require location information, i.e. if he does not press the mode selector switch 7b, it is determined that the answer to the question at the step 213 is negative (NO) and the program ends.

Next, the driver drives his vehicle to the exit of the parking lot, and hands over the portable transceiver Tn to the supervisor. The supervisor presses the selector switch 7b of the portable transceiver Tn to send a vehicle exit time to the main computer 61. Based on this exit time, the main computer 61 computes a usage fee, deducts a percentage based on the sum value of purchases made by the parking lot user, and prints a parking fee from the printer 4 of the portable transceiver Tn. The printed ticket is then handed to the parking lot user. Parking fee computation and printer flowcharts have been omitted.

Subsequently, the supervisor returns the portable transceiver Tn to the battery charger 63. The information stored in the portable transceiver Tn is thereby cleared, and the transceiver is charged.

If the driver modifies the parking time, therefore, the modification can be made known to the control room, such as for example, whether the driver intends to return 30 minutes or 1 hour later, and it is thus possible to correctly assess the availability of vacancies in the parking lot. In particular, if the parking lot is full, other drivers can be told exactly how long they will have to wait to park their vehicle, and a more efficient service can thus be provided to parking lot users.

Further, according to this embodiment, the portable transceiver Tn is provided with a speaker 3. Time limits and urgent messages can therefore be communicated by means of a buzzer or sound to the parking lot user who is engrossed in shopping so that a better allround service is provided, and management of the parking lot is streamlined. In addition, as digital transmitting and receiving circuits are used, transmitted and received data are reproduced in the form of highly stable signals which permits accurate exchange of information.

Further, according to this embodiment, fixed transceivers R were provided in the parking lot for relay purposes, but if the portable transceivers Tn have a sufficient range, the relay communications device 62 provided in the control room will be sufficient.

Further, as shown in FIG. 5, the transceivers Tn may however also have analog circuitry.

What is claimed is:

1. A parking data transfer system provided with first communications devices installed in vehicles or in a car park, and second communications devices which receive signals from the first communications devices and transmit signals to same, characterized in that said first communications devices each comprise:
   first input means to input a parking time of a vehicle,
   memory means to store the parking time input by said input means,
   first display means for displaying the parking time stored by said memory means,
   timing means to start a clock when information is input by said memory means,
   first transmitting means for transmitting a notifying signal when the time measured by said timing means has reached said parking time,
   first receiving means for receiving signals, including a parking time updating signal, transmitted by said second communications devices,
   updating means to update the parking time stored in said memory means and displayed on said first display means in response to said parking time updating signal being received by said first receiving means, and
further characterized in that said second communications devices each comprise:
   second receiving means for receiving said notifying signal transmitted by said first transmitting means,
   notifying means for notifying when said second receiving means has received said notifying signal, and
   transmitting means for transmitting a parking time updating signal.

2. A parking data transfer system defined as according to claim 1 characterized in that said notifying means comprises a vibrator which vibrates when second receiving means has received said notifying signal.

3. A parking data transfer system defined as according to claim 1 characterized in that said notifying means comprises a sound generator which emits a sound when second receiving means has received said notifying signal.

4. A parking data transfer system defined as according to claim 1 characterized in that said second communications devices each further comprise:
   second input means for inputting information including parking locations and parking times,
   memory means for storing information input by said second input means, and second display means for displaying information stored by said memory means when said second receiving means has received said notifying signal.

5. A parking data transfer provided with a controller installed in a control room, and a communications device for receiving signals from this controller and transmitting information to same, characterized in that said controller comprises:
   a first receiver for receiving signals transmitted by said communications device,
   memory means for storing a parking time when said first receiver has received parking information transmitted by said communications device,
   timing means to start a clock when information is input by said memory means,
   a first transmitter for transmitting a notifying signal when the time measured by said timing means has reached said parking time,
   updating means for updating the parking time stored by said memory means when said first receiver has received a parking time updating signal,
   display means for displaying the updated parking time when said timing means has reached said parking time, and the parking time has been updated by said updating means, and
further characterized in that said communications device comprises:
   input means for inputting the parking time,
   a second transmitter for transmitting the parking time input by said input means to said controller,
   a second receiver for receiving said notifying signal transmitted by the first transmitter,
   notifying means for notifying that said second receiver has received said notifying signal, and updating and transmitting means for transmitting said parking time updating signal from said second transmitter to update the parking time stored in said memory means.

6. A parking data transfer system defined as according to claim 5 characterized in that said notifying means comprises a vibrator which vibrates when said notifying means has received said notifying signal.

7. A parking data transfer system defined as according to claim 5 characterized in that said notifying means comprises a sound generator which emits a sound when said notifying means has received said notifying signal.

8. A parking data transfer system defined as according to claim 5 characterized in that said input means comprises location input means for inputting parking locations, location memory means for storing locations input by said location input means, and a location display device for displaying locations stored by said location memory means when said second receiver has received said notifying signal.

* * * * *